US009750035B2

(12) United States Patent
Lindoff et al.

(10) Patent No.: US 9,750,035 B2
(45) Date of Patent: Aug. 29, 2017

(54) SCHEDULING APPARATUS AND METHOD THEREOF FOR SETTING UP DEVICE-TO-DEVICE COMMUNICATION

(71) Applicant: Telefonaktiebolaget L M Ericsson (publ), Stockholm (SE)

(72) Inventors: Bengt Lindoff, Bjärred (SE); Bo Hagerman, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 127 days.

(21) Appl. No.: 14/399,213

(22) PCT Filed: May 8, 2013

(86) PCT No.: PCT/EP2013/059596
§ 371 (c)(1),
(2) Date: Nov. 6, 2014

(87) PCT Pub. No.: WO2013/171114
PCT Pub. Date: Nov. 21, 2013

(65) Prior Publication Data
US 2015/0117239 A1   Apr. 30, 2015

Related U.S. Application Data

(60) Provisional application No. 61/647,115, filed on May 15, 2012.

(30) Foreign Application Priority Data

May 15, 2012   (EP) ..................................... 12168032

(51) Int. Cl.
*H04W 72/08*   (2009.01)
*H04W 24/08*   (2009.01)
(Continued)

(52) U.S. Cl.
CPC ......... *H04W 72/082* (2013.01); *H04W 24/08* (2013.01); *H04W 72/08* (2013.01); *H04W 76/023* (2013.01); *H04W 28/08* (2013.01)

(58) Field of Classification Search
None
See application file for complete search history.

(56) References Cited

U.S. PATENT DOCUMENTS 9,320,047 B2 *   4/2016   Li ........................ H04W 72/085
2004/0233888 A1 *   11/2004   Bonta ................... H04W 16/14
370/350

(Continued)

FOREIGN PATENT DOCUMENTS

EP   2326030 A1   5/2011
WO   2011088886 A1   7/2011
(Continued)

OTHER PUBLICATIONS

Fodor, G., "Design Aspects of Network Assisted Device-to-Device Communications", IEEE Communications Magazine, Mar. 1, 2012, pp. 170-177, IEEE.
(Continued)

*Primary Examiner* — Robert C Scheibel
(74) *Attorney, Agent, or Firm* — Coats & Bennett, PLLC (57) ABSTRACT

The present disclosure relates to a scheduling apparatus (109) for reducing interference in a cellular radio communication system (110). The apparatus comprises a processor. The processor is configured for obtaining an indication that direct (D2D) wireless communication should be set up between a first wireless communication terminal and a second wireless communication terminal of the communication system. The processor is also configured for measuring at least one metric of the communication system, said measurement indicating a risk of interference of signalling from the second terminal to the first terminal. The processor
(Continued)

is also configured for allocating, based on said measurement, a first set of frequency and/or time resources (f/t resources) for D2D transmissions from the first terminal to the second terminal. The first set of f/t resources defines a first amount of signalling. The processor is also configured for allocating, based on said measurement, a second set of f/t resources for D2D transmissions from the second terminal to the first terminal. The second set of f/t resources defines a second amount of signalling. The second amount of signalling is less than the first amount of signalling.

26 Claims, 4 Drawing Sheets

(51) Int. Cl.
*H04W 76/02* (2009.01)
*H04W 28/08* (2009.01)

(56) References Cited

U.S. PATENT DOCUMENTS

| | | | | |
|---|---|---|---|---|
| 2006/0258382 A1* | 11/2006 | Zhang | ............... | H04W 72/082 455/501 |
| 2010/0093364 A1 | 4/2010 | Ribeiro et al. | | |
| 2010/0261469 A1 | 10/2010 | Ribeiro et al. | | |
| 2010/0279672 A1 | 11/2010 | Koskela et al. | | |
| 2011/0151887 A1* | 6/2011 | Hakola | ............... | H04W 72/0453 455/452.2 |
| 2011/0244899 A1 | 10/2011 | Li et al. | | |
| 2011/0312331 A1 | 12/2011 | Hakola et al. | | |
| 2012/0008568 A1* | 1/2012 | Gong | ............... | H04W 74/0875 370/329 |
| 2012/0051315 A1 | 3/2012 | Wang et al. | | |
| 2012/0076086 A1 | 3/2012 | Bercovich et al. | | |
| 2012/0077510 A1 | 3/2012 | Chen et al. | | |
| 2012/0087253 A1 | 4/2012 | Patil et al. | | |
| 2012/0243431 A1* | 9/2012 | Chen | ............... | H04W 72/0406 370/252 |
| 2012/0250636 A1* | 10/2012 | Wang | ............... | H04W 72/08 370/329 |
| 2013/0195026 A1* | 8/2013 | Johnsson | ............... | H04W 76/048 370/329 |
| 2013/0252621 A1* | 9/2013 | Dimou | ............... | H04W 72/082 455/450 |
| 2013/0294296 A1* | 11/2013 | Dimou | ............... | H04W 72/082 370/280 |
| 2014/0128089 A1* | 5/2014 | Jang | ............... | H04W 72/082 455/452.2 |
| 2014/0153390 A1* | 6/2014 | Ishii | ............... | H04W 76/023 370/230 |
| 2014/0247802 A1* | 9/2014 | Wijting | ............... | H04W 76/023 370/329 |
| 2015/0043475 A1* | 2/2015 | Kim | ............... | H04L 5/0037 370/329 |
| 2015/0230257 A1* | 8/2015 | Hagerman | ............... | H04W 76/023 455/456.5 |

FOREIGN PATENT DOCUMENTS

| | | |
|---|---|---|
| WO | 2011109941 A1 | 9/2011 |
| WO | 2011116017 A1 | 9/2011 |

OTHER PUBLICATIONS

LG Electronics; Interference Coordination Issues for LTE_TDD_eIMTA; 3GPP TSG RAN WG1 Meeting #69; R1-122319; May 21-25, 2012; Prague, Czech Republic; pp. 1-4.

* cited by examiner

SCHEDULING APPARATUS AND METHOD THEREOF FOR SETTING UP DEVICE-TO-DEVICE COMMUNICATION

TECHNICAL FIELD

The present disclosure relates to a scheduling apparatus for a cellular radio communication system.

BACKGROUND

Device-to-Device (D2D) communication is about direct communication between devices. Sometimes a radio access network with access nodes is present and the devices operate within this radio network, but in some scenarios the communication devices itself constitute the radio access network.

There are several basic (potential) motivations for introducing the possibility for D2D communication.

Although the overall communication service can be provided by means of conventional device-to-access-point communication it can sometimes be provided in a better way with direct D2D communication. It could e.g. be so that the communication between two devices could be achieved at higher rate, with shorter latencies, or using less network resources (less capacity of an access node) if the communication is done directly between the devices than via network nodes (access nodes). The later can be seen as an offloading of the network.

A second reason for direct D2D communication is if the service to be provided cannot be supported (within given requirement boundaries) unless direct D2D communication is applied.

A third reason for supporting direct D2D communication is to ensure communication availability even if the network infrastructure for one reason or another is not available. This reason for supporting direct D2D communication is often mentioned e.g. in relation to National Security and Public Safety (NSPS) services but also for traffic safety applications. More generally, one can say D2D communication is used in this scenario to increased robustness and reliability.

Also, sometimes information is only valid or of interest in a local area, in which case it can make sense to rely on D2D communication.

Network-assistance can help in setting up a D2D service, i.e. assist in service and peer discovery and also in establishing security of the D2D link. Furthermore, the interference environment is under control for the network, which enables usage of licensed operator's spectrum (since the communication is under operator's control) whereby there is higher reliability than in unlicensed spectrum. The network can also provide synchronization and can assist in Radio Resource Management (RRM). An application of network assisted D2D is network offloading, where user plane data is exchanged directly between nearby terminals without been sent via a base station in order to reduce the load on the network nodes.

Prior to setting up a D2D communication between two devices, say D1 and D2, the network node does not know whether D1 and D2 is in proximity to each other, so that D2D communication is possible. A typical approach is to allocate a beacon signal to D1 and then require D2 to listen for the beacon and report detection of the beacon signal. There is a risk for interference with other units network communication or D2D communication during beacon signalling, and it can be a capacity waste to allocate, say orthogonal (such that other communication is not interfered) resources for beacon signalling if it turns out that the devices are too far from each other.

US 2010/0279627 discloses an apparatus and a method of switching between a D2D mode and a cellular mode in response to a command from a controller. Upon receiving a control command, both user equipments (UEs) set up for D2D mode communication, switching from cellular mode to D2D mode for direct communication with each other.

US 2010/093364 relates to a base station which schedules device-to-device communication between a UE pair based on interference or path loss measurements. The base station can also schedule the D2D groups on resources with low interference from and to UEs engaged in cellular communication.

US 2012/076086 provides a method of allocating wireless communication capacity in a wireless point-to-point link including obtaining a channel having a bandwidth for use in the wireless point-to-point link, allocating a first portion of the bandwidth for use for transmitting from a first point to a second point of the wireless point-to-point link, and allocating a second portion of the bandwidth for use for transmitting from the second point to the first point of the wireless point-to-point link, in which the bandwidth is asymmetrically assigned between the first portion and the second portion. To provide more capacity in one direction than another, an available spectrum is taken and split it into smaller segments, or sub-bands, for example sub-bands of 7 MHz each, or 3.5 MHz each, and the different sub-bands are allocated asymmetrically over the links. Thus, the document is related to asymmetrical scheduling of frequency resources based on asymmetrically needed capacity.

US 2012/087253 discloses peer-to-peer scheduling in addition to cellular wireless wide area network (WWAN) scheduling, where a wireless device can communicate with another wireless device via peer-to-peer while also communicating with a base station.

SUMMARY

It is an objective of the present disclosure to alleviate a problem of the prior art associated with setting up D2D communication within a cellular communication system.

According to an aspect of the present disclosure, there is provided a scheduling apparatus for reducing interference in a cellular radio communication system. The scheduling apparatus comprises a processor. The processor is configured for obtaining an indication that direct wireless communication should be set up between a first wireless communication terminal and a second wireless communication terminal of the communication system. The processor is also configured for measuring at least one metric of the communication system, said measurement indicating a risk of interference of signalling from the second terminal to the first terminal. The processor is also configured for allocating, based on said measurement of at least one metric, a first set of frequency and/or time resources (f/t resources) for direct communication (D2D) transmissions from the first terminal to the second terminal. The first set of f/t resources defines a first amount of signalling. The processor is also configured for allocating, based on said measurement of at least one metric, a second set of frequency and/or time resources for direct communication (D2D) transmissions from the second terminal to the first terminal. The second set of f/t resources defines a second amount of signalling. The second amount of signalling is less than the first amount of signalling.

According to another aspect of the present disclosure, there is provided a network node of the communication system. Said network node comprises an embodiment of the scheduling apparatus of the present disclosure, wherein the scheduling apparatus is integrated in the network node.

According to another aspect of the present disclosure, there is provided a method in a scheduling apparatus for reducing interference in a cellular radio communication system. The method comprises obtaining an indication that direct wireless communication should be set up between a first wireless communication terminal and a second wireless communication terminal of the communication system. The method also comprises measuring at least one metric of the communication system, said measurement indicating a risk of interference of signalling from the second terminal to the first terminal. The method also comprises allocating, based on said measurement of at least one metric, a first set of frequency and/or time resources for direct communication transmissions from the first terminal to the second terminal. The first set of f/t resources defines a first amount of signalling. The method also comprises allocating, based on said measurement of at least one metric, a second set of frequency and/or time resources for direct communication transmissions from the second terminal to the first terminal. The second set of f/t resources defines a second amount of signalling. The second amount of signalling is less than the first amount of signalling.

An embodiment of the method of the present disclosure may e.g. be performed by an embodiment of the scheduling apparatus of the present disclosure.

According to another aspect of the present disclosure, there is provided a computer program product comprising computer-executable components for causing a scheduling apparatus to perform an embodiment of the method of the present disclosure, when the computer-executable components are run on a processor associated with the scheduling apparatus.

According to another aspect of the present disclosure, there is provided a computer program for a scheduling apparatus for reducing interference in a cellular radio communication system. The computer program comprises computer program code which is able to, when run on a processor of the scheduling apparatus, cause the scheduling apparatus to obtain an indication that direct wireless communication should be set up between a first wireless communication terminal and a second wireless communication terminal of the communication system. The code is also able to cause the apparatus to measure at least one metric of the communication system, said measurement indicating a risk of interference of signalling from the second terminal to the first terminal. The code is also able to cause the apparatus to allocate, based on said measurement of at least one metric, a first set of frequency and/or time resources for direct communication transmissions from the first terminal to the second terminal. The first set of f/t resources defines a first amount of signalling. The code is also able to cause the apparatus to allocate, based on said measurement of at least one metric, a second set of frequency and/or time resources for direct communication transmissions from the second terminal to the first terminal. The second set of f/t resources defines a second amount of signalling. The second amount of signalling is less than the first amount of signalling.

According to another aspect of the present disclosure, there is provided a computer program product comprising an embodiment of the computer program of the present disclosure. The computer program product also comprises a computer readable means on which the computer program is stored.

According to another aspect of the present disclosure, there is provided a radio communication terminal. The terminal comprises a transmitter, a receiver and a processor. The processor is configured for obtaining, from the receiver, information about frequency and/or time resources allocated for direct communication (D2D) with another radio communication terminal. The processor is also configured for using the frequency and/or time resources for preparing transmissions to be sent by the transmitter directly to the other radio communication terminal. The processor is also configured for preparing excess transmissions to be sent by the transmitter to the other radio communication terminal via a network node. Said excess transmissions can not be sent directly (D2D) to the other radio communication terminal due to the frequency and/or time resources allocated for direct communication. Thus, in accordance with this aspect of the present disclosure, a (first) radio communication terminal can transmit to the other (second) radio communication terminal using both D2D communication and communication via the network node if the f/t resources allocated for direct communication (i.e. D2D communication) are not enough for all transmissions desired to be sent to the other (second) radio communication terminal.

According to another aspect of the present disclosure, there is provided a method of a radio communication terminal. The method comprises receiving, over a radio interface, information about frequency and/or time resources allocated for direct communication (D2D) with another radio communication terminal. The method also comprises using the frequency and/or time resources for sending transmissions directly to the other radio communication terminal. The method also comprises sending excess transmissions to the other radio communication terminal via a network node.

The excess transmissions can not be sent directly (D2D) to the other radio communication terminal due to the frequency and/or time resources allocated for direct communication.

It is an advantage of the present disclosure that devices and methods are provided which enables asymmetric allocation of frequency and/or time resources (f/t resources), by a scheduling apparatus of a radio communication system, to a D2D communication between two radio communication terminals. Thus, interference between the D2D communication and other radio communication in the communication system can be reduced by allocating less f/t resources to D2D transmissions from a second terminal to a first terminal than to D2D transmissions from the first terminal to the second terminal. By virtue of embodiments of the present disclosure, D2D transmissions can be allowed in one direction between two terminals, which direction is not believed to cause too much interference, while transmissions in the opposite direction, which direction is believed to cause interference, can be reduced or not at all allowed, optimising the use of D2D communication while keeping down the interference in the communication system.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 10b schematically illustrates allocation of time slots for the example of FIG. 10a.

FIG. 11b schematically illustrates allocation of time slots for the example of FIG. 11a.

FIG. 12b schematically illustrates allocation of time slots for the example of FIG. 12a.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
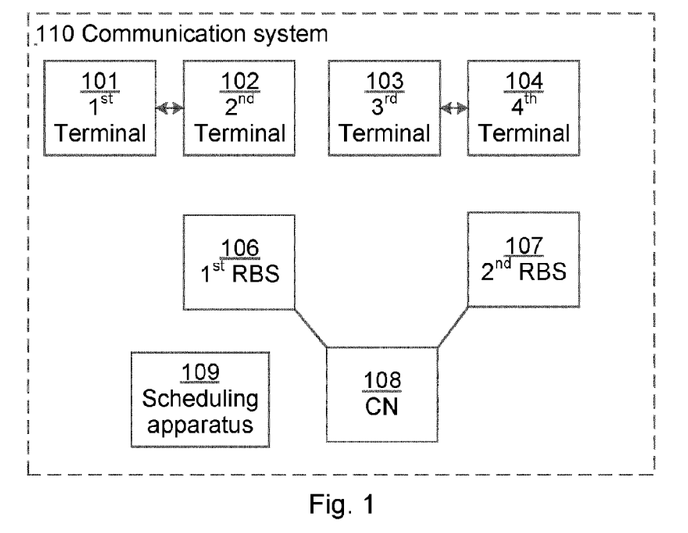
FIG. 1 is a schematic box diagram of an embodiment of a communication system of the present disclosure.

FIG. 1 schematically illustrates a wireless communication system 110 in which an embodiment of the present disclosure can be beneficially used. The system 110 comprises a core network (CN) 108 associated with a radio access network (RAN) comprising a plurality of radio base stations (RBSs), here a first RBS 106 and a second RBS 107, via which a plurality of wireless communication terminals can connect to the CN 108 over a radio interface. In the embodiment of FIG. 1, four terminals are depicted, a first terminal 101, a second terminal 102, a third terminal 103 and a fourth terminal 104. Depending on the communication standard used by the system no, other types of network nodes than the RBSs can be comprised in the RAN, e.g. a radio network control (RNC) node or a positioning node. The system 110 is a cellular radio communication system configured in accordance with any cellular radio communication standard, such as Global System for Mobile Communications (GSM), Universal Mobile Telecommunication System (UMTS), Long Term Evolution (LTE), Wideband Code Division Multiple Access (WCDMA), Ultra Mobile Broadband (UMB) and/or High-Speed Packet Access (HSPA). The system 110 may be a time division duplex (TDD) system or a frequency division duplex (FDD) system, as regards the uplink (UL) and downlink (DL) communication between a terminal 101-105 and its associated RBS 106 or 107. Consequently, the first and second RBS 106 and 107 as well as the terminals 101-104 are configured in accordance with any such communication standard which the system 110 is configured in accordance with. Any of the RBSs may e.g. be a Node B (NB) of a WCDMA/HSPA standard, or an evolved Node B (eNB) of an LTE standard. Any of the terminals 101-104 may e.g. be a mobile terminal such as a mobile phone, a modem or a portable computer or any other wireless device, or a stationary terminal such as a household appliance (fridge, freezer or the like) or an energy management gateway. The system 110 comprises a scheduling apparatus 109 configured for scheduling direct D2D communication between any of the terminals 101-104 of the system 110, as discussed herein. The scheduling apparatus may be a separate node of the system 110 or it may be integrated in a node of the system 110, such as in an RBS 106 and/or 107 or other RAN node, or in a node of the CN 108. The apparatus 109 is further discussed below in relation to FIG. 2. The scheduling apparatus 109 is configured for allocating frequency/time (f/t) resources for direct D2D communication between the terminals, e.g. between the first terminal 101 and the second terminal 102 (as indicated by the double-headed arrow there between in FIG. 1) and/or between the third terminal 103 and the fourth terminal 104 (as indicated by the double-headed arrow there between in FIG. 1). Conveniently, any direct communication (D2D) between two terminals is TDD communication, regardless of whether the communication standard of the system 110 is TDD or FDD for communication between terminals and their associated RBSs. The D2D communication may conveniently be scheduled on the UL frequency (in case of FDD communication standard for communication between terminals and RBS 106) or on UL resources (in case of FDD communication standard for communication between terminals and RBS 106), allowing the RBS 106 and/or 107 to monitor and detect any interference caused by the D2D communication. However, in some embodiments, DL frequency or DL resources may additionally or alternatively be used for the D2D communication. This implies that the terminals involved in D2D communication should be able to receive data also on the UL frequency (not only on the DL frequency). This also implies that there is a risk that the D2D communication (e.g. between the first terminal 101 and the second terminal 102) may interfere with UL transmissions from other terminals (e.g. the third terminal 103 and/or the fourth terminal 104) of the system to its associated RBS 106 or 107, or with D2D communication conducted on the UL frequency between other terminals of the system (e.g. between the third terminal 103 an the fourth terminal 104). The apparatus 109 may allocate a first set of f/t resources to D2D communication from the first terminal 101 to the second terminal 102, and allocate a second set of f/t resources to D2D communication from the second terminal 102 to the first terminal 101. If D2D communication is then also to be set up between the third terminal 103 and the fourth terminal 104, the apparatus 109 may decide, based on the risk of interference, to allocate the same (or overlapping) f/t resources as for the D2D between the first and second terminals also to the D2D between the third and fourth terminals, or to allocate other f/t resources which are completely different from those for the D2D between the first and second terminals in order to avoid interference between the different D2D communications. It may be convenient that both terminals 101 and 102, between which D2D communication is considered, are connected to the same RBS 106 or 107, especially if the scheduling unit 109 is integrated in the RBS, but it is also possible to use embodiments of the present disclosure in situations where the two terminals are connected via different RBSs.

Figure 2:
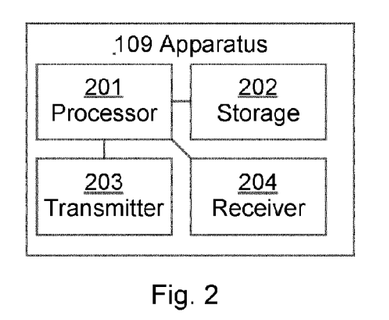
FIG. 2 is a schematic box diagram of an embodiment of a scheduling apparatus of the present disclosure.

FIG. 2 schematically illustrates an embodiment of a scheduling apparatus 109 of the present disclosure. The apparatus 109 comprises or is otherwise associated with a processor 201 such that the processor 201 can be used by the apparatus 109. The processor 201 may be dedicated to the apparatus 109, or the processor 201 may be associated with and used also by other devices/functionalities or the like which are not part of the apparatus 109. The processor 201 may comprise one or more processing units in the form of microprocessor(s) configured for executing appropriate software stored in associated memory 202 for procuring required functionality. However, other suitable devices with computing capabilities could be used, e.g. an application specific integrated circuit (ASIC), a field programmable gate array (FPGA), a complex programmable logic device (CPLD), etc. The apparatus 109 comprises, or is otherwise associated with, a storage unit or memory 202 configured for cooperation with the processor 201, e.g. such that a computer program (software) stored on the storage unit 202 can be run on the processor 201, such that the processor 201 can obtain information stored on the storage unit 202 and/or such that the processor 201 can store information on the storage unit 202. The apparatus 109 also comprises, or is otherwise associated with, a transmitter 203 and a receiver 204, which may be combined to form a transceiver or be present as distinct units within the apparatus 109. The transmitter 203 and the receiver 204 are configured to cooperate with the processor 201 to send and receive, respectively, signals to/from elements of the communication system 110. The transmitter 203 and the receiver 204 may be configured for wireless (radio) signalling or for wired signalling. If, e.g. the apparatus 109 is integrated with a radio base station (RBS), the transmitter 203 and the receiver 204 may be the regular transmitter and receiver of the RBS, just as the processor 201 and storage unit 202 may also be associated with other parts of the RBS and not be exclusively for the apparatus 109. The processor 201 is configured for obtaining an indication that direct wireless communication should be set up between a first wireless communication terminal 101 and a second wireless communication terminal 102 of the communication system 110. This indication may e.g. be the result of a request for D2D communication from one of the first and second terminals, or be the result of the scheduling apparatus 109, RBS 106 or 107, or any other part of the system 110 requesting that D2D communication is set up, e.g. because it has somehow been determined that the first and second terminals are close to each other or in the same building or such. The processor 201 is also configured for measuring at least one metric of the communication system 110. In some embodiments the metric is associated with interference or channel quality. Interference may e.g. be measured in communication between the third terminal 103 or the fourth terminal 104 and the RBS 106 or 107 which the terminal is associated with. Such interference may be due to any D2D communication between the first and second terminals 101 and 102, especially if the D2D communication is conducted on an UL frequency of the system 110. Examples of interference metrics include but are not limited to signal-to-interference ratio (SIR), Signal-to-Interference-and-Noise Ratio (SINR), block error rate (BLER) and/or bit error rate (BER). Additionally or alternatively, interference may be measured in direct D2D communication between the third terminal 103 and the fourth terminal 104. Such interference may indicate that the two D2D communications (between the first and second terminals and between the third and fourth terminals) interfere with each other. In some embodiments, the metric is related to a geographical position of one or both of the first and second terminals 101 and 102, and/or to a geographical position of one or both of the third and fourth terminals 103 and 104. A position metric may be obtained via the receiver 204 and may be e.g. global navigation satellite system (GNSS) information or positioning pilots information from the respective terminals. A position of the first and/or second terminals may be used to determine whether the terminals are close enough to each other to be able to communicate directly and at a signal power which is low enough not to interfere with e.g. the third and/or fourth terminals. A position of the third and/or fourth terminals may indicate whether the terminal is so close to one or both of the first and second terminals that D2D transmissions from the first and/or second terminal may result in interference with the third and/or fourth terminal transmissions. Thus, the processor 201 might be configured for obtaining information about a geographical position held by the first wireless communication terminal 101 and a geographical position held by the second wireless communication terminal 102 of the communication system 110. In some embodiments, the metric is related to an amount of data to be sent between the first wireless communication terminal 101 and the second wireless communication terminal 102. If much data is to be sent there between, the benefit of setting up D2D communication is great, whereby possibly a somewhat higher risk of interference may be tolerated. In some embodiments, the metric may be related to the topography of an area covered by the system 110. The topography may e.g. indicate whether there are any topographical obstacles (e.g. buildings, walls, hills etc.) which may make D2D communication between the first and second terminals more difficult, or which may shield the first and second terminals from other terminals such that the risk of interference with the other terminals is reduced. If e.g. the topographical information indicates that the first terminal is inside a building, the scheduling apparatus 109 may conclude that the risk of interference by transmissions from the first terminal 101 is reduced. The processor 201 is configured for allocating, based on said measurement of at least one metric, a first set of frequency and/or time resources for direct communication transmissions from the first terminal 101 to the second terminal 102, the first set of resources defining a first amount of signalling. The amount of signalling, i.e. the amount of radio signal, allowed from the first terminal to the second terminal is limited by the f/t resources allocated by the scheduling apparatus. The processor 201 is also configured for allocating, based on said measurement of at least one metric, a second set of frequency and/or time resources for direct communication transmissions from the second terminal 102 to the first terminal 101, the second set defining a second amount of signalling. According to the present disclosure, the first amount of signalling is larger than the second amount of signalling. Consequently, the second amount of signalling is less than the first amount of signalling. This implies that more signalling in D2D communication is allowed from the first terminal to the second terminal, than is allowed from the second terminal to the first terminal. The amount of signalling allowed from the second terminal from the first terminal may even be zero, i.e. no D2D transmission is allowed from the second terminal to the first terminal, e.g. if radio transmissions from the second terminal interferes, or is believed to interfere, substantially with other radio transmissions in the system 110. Alternatively, the second set of frequency and/or time resources limits direct communication transmissions, from the second terminal 102 to the first terminal 101, to feedback information in response to direct communication transmissions received from the first terminal 101. Feedback information may e.g. be hybrid automatic repeat request HARQ acknowledgement ACK and negative acknowledgement NAK and/or channel quality indicator CQI or channel state indicator CSI reports and/or radio channel rank information. Information about the allocated f/t resources may be sent to one or both of the terminals 101 and 102 together with instruction for setting up the direct communication. The processor 201 may be controlled by a computer program stored in the storage unit 202 and run on the processor 201, such that the processor is configured to perform the actions of the processor discussed herein.

The processor 201 might be configured for obtaining topographical information concerning a geographical area covered by the communication system 110, e.g. from the database comprising the topographical information. In some embodiments, the database is comprised in the apparatus 109, e.g. held in the storage unit 202. In other embodiments, the database 111 is separate from the apparatus 109, and the processor 201 may obtain information from the database via the receiver 204. The processor 201 might be configured for determining, based on obtained topographical information and on obtained geographical positions of the first and second terminals, whether direct wireless communication should be set up between the first wireless communication terminal and the second wireless communication terminal. By means of position information, the processor 201 may be able to determine whether the terminals have positions close enough to each other to enable direct communication and/or prevent interference with other radio communication in the system 110 if direct, i.e. D2D, communication is set up. By means of topographical information, in combination with the position information, the processor may be able to determine whether there are any topographical obstacles to direct communication (e.g. walls or buildings) between the terminals 101 and 102. The f/t resources may be allocated in view of obtained position information and/or topographical information in order to reduce the risk of interference with other radio signalling in the system 110.

In some embodiments, the processor 201 is configured for allocating frequency and/or time resources for sending excess transmissions between the first and second terminals 101 and 102 via a network node 106 and/or 107, which excess transmissions can not be sent directly between the first and second terminals due to the frequency and/or time resources allocated for direct communication.

In some embodiments, the processor 201 of the scheduling apparatus 109 is associated with a transmitter 203 configured for wirelessly sending a message comprising information about the allocated frequency and/or time resources to at least one of the first terminal 101 and the second terminal 102, and wherein the processor 201 is configured for preparing and supplying said message for said transmitter 203.

In some embodiments, the processor 201 is configured for re-measuring the at least one metric. The processor 201 then is also configured for determining, based on the re-measurement, whether the frequency and/or time resources allocated to the first and/or second terminal(s) 101 and/or 102 should be changed. The processor 201 then is also configured for changing the allocation of frequency and/or time resources for the direct communication between the first and second terminals 101 and 102, if it has been determined that the resources should be changed The processor 201 then is also configured for preparing and supplying a message, comprising information about the changed allocation of frequency and/or time resources, for the transmitter 203, for wireless transmission to at least one of the first terminal 101 and the second terminal 102.

Figure 3:
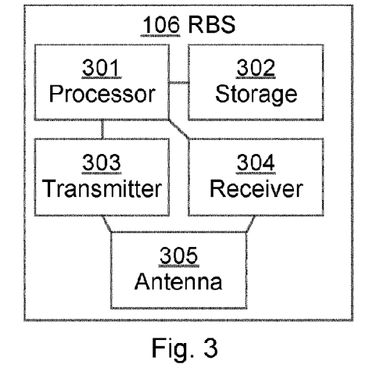
FIG. 3 is a schematic box diagram of an embodiment of a radio base station (RBS) of the present disclosure.

FIG. 3 schematically illustrates an embodiment of an RBS 106 (also relevant for the RBS 107) of the present disclosure. The RBS 106 comprises a processor or central processing unit (CPU) 301. The processor 301 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 301 is configured to run one or several computer program(s) or software stored in a storage unit or memory 302. The storage unit is regarded as a computer readable means and may e.g. be in the form of a Random Access Memory (RAM), a Flash memory or other solid state memory, or a hard disk. The processor 301 is also configured to store data in the storage unit 302, as needed. The RBS 106 also comprises a transmitter 303, a receiver 304 and an antenna 305, which may be combined to form a transceiver or be present as distinct units within the RBS 106. The transmitter 303 is configured to cooperate with the processor to transform data bits to be transmitted over a radio interface to a suitable radio signal in accordance with the radio access technology (RAT) used by the RAN via which the data bits are to be transmitted. The receiver 304 is configured to cooperate with the processor 301 to transform a received radio signal to transmitted data bits. The antenna 305 may comprise a single antenna or a plurality of antennas, e.g. for different frequencies and/or for MIMO (Multiple Input Multiple Output) communication. The antenna 305 is used by the transmitter 303 and the receiver 304 for transmitting and receiving, respectively, radio signals. If the scheduling apparatus 109 is integrated or otherwise associated with the RBS 106, the processor 301 of the RBS may also function as the processor 201 of the apparatus 109, the storage unit 302 of the RBS may also function as the storage unit 202 of the apparatus 109, the transmitter 303 of the RBS 106 may also function as the transmitter 203 of the apparatus 109, and/or the receiver 304 of the RBS may also function as the receiver 204 of the apparatus 109. In some embodiments, the RBS 106 is a network node to which both the first and second terminals 101 and 102 are connected.

Figure 4:
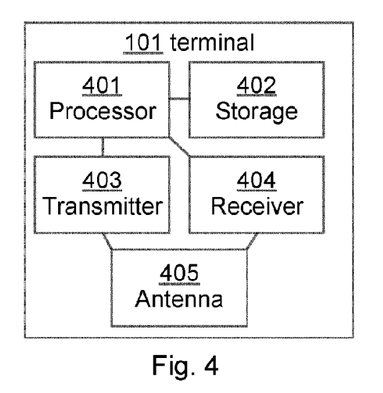
FIG. 4 is a schematic box diagram of an embodiment of a wireless communication terminal of the present disclosure.

FIG. 4 schematically illustrates an embodiment of a wireless communication terminal 101 (also relevant for any other terminal 102-104 discussed herein) of the present disclosure. The terminal 101 comprises a processor or central processing unit (CPU) 401. The processor 401 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 401 is configured to run one or several computer program(s) or software stored in a storage unit or memory 402. The storage unit is regarded as a computer readable means and may e.g. be in the form of a Random Access Memory (RAM), a Flash memory or other solid state memory, or a hard disk. The processor 401 is also configured to store data in the storage unit 402, as needed. The terminal 101 also comprises a transmitter 403, a receiver 404 and an antenna 405, which may be combined to form a transceiver or be present as distinct units within the terminal 101. The transmitter 403 is configured to cooperate with the processor to transform data bits to be transmitted over a radio interface to a suitable radio signal in accordance with the RAT used by the RAN via which the data bits are to be transmitted. The receiver 404 is configured to cooperate with the processor 401 to transform a received radio signal to transmitted data bits. The antenna 405 may comprise a single antenna or a plurality of antennas, e.g. for different frequencies and/or for MIMO (Multiple Input Multiple Output) communication. The antenna 405 is used by the transmitter 403 and the receiver 404 for transmitting and receiving, respectively, radio signals.

Figure 5:
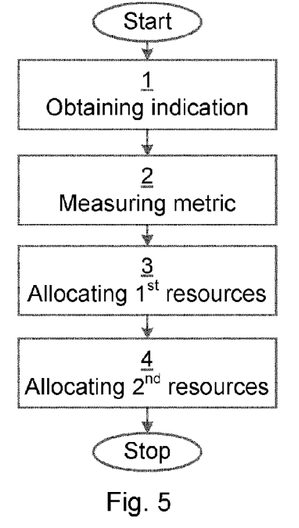
FIG. 5 is a schematic flow chart of an embodiment of a method of a scheduling apparatus, of the present disclosure.

FIG. 5 is a flow chart illustrating an embodiment of a method of a scheduling apparatus 109, of the present disclosure.

An indication that direct wireless communication should be set up between a first wireless communication terminal 101 and a second wireless communication terminal 102 of the communication system 110 is obtained 1. This indication may e.g. be the result of a request for D2D communication from one of the first and second terminals 101 or 102, or be the result of the scheduling apparatus 109, RBS 106 or 107, or any other part of the system 110 requesting that D2D communication is set up, e.g. because it has somehow been determined that the first and second terminals are close to each other or in the same building or such. Whether the terminals are close together may be determined by means of obtaining position information of the terminals as discussed herein.

At least one metric of the communication system 110 is measured 2. The measurement indicates a risk of interference of signalling from the second terminal 102 to the first terminal 101. The metric is thus such that a value of it as measured in accordance with the discussion herein is indicative of whether there is a risk of interference or not, and possibly how high such a risk is. In some embodiments the metric is associated with interference or channel quality. Interference may e.g. be measured in communication between the third terminal 103 or the fourth terminal 104 and the RBS 106 or 107 which the terminal is associated with. Such interference may be due to any D2D communication between the first and second terminals 101 and 102, especially if the D2D communication is conducted on an UL frequency of the system 110 Examples of interference metrics include but are not limited to signal-to-interference ratio (SIR), Signal-to-Interference-and-Noise Ratio (SINR), block error rate (BLER) and/or bit error rate (BER). Additionally or alternatively, interference may be measured in direct D2D communication between the third terminal 103 and the fourth terminal 104. Such interference may indicate that the two D2D communications (between the first and second terminals and between the third and fourth terminals) interfere with each other. In some embodiments, the metric is related to a geographical position of one or both of the first and second terminals 101 and 102, and/or to a geographical position of one or both of the third and fourth terminals 103 and 104. A position metric may be obtained via the receiver 204 and may be e.g. global navigation satellite system (GNSS) information or positioning pilots information from the respective terminals. A position of the first and/or second terminals may be used to determine whether the terminals are close enough to each other to be able to communicate directly and at a signal power which is low enough not to interfere with e.g. the third and/or fourth terminals. A position of the third and/or fourth terminals may indicate whether the terminal is so close to one or both of the first and second terminals that D2D transmissions from the first and/or second terminal may result in interference with the third and/or fourth terminal transmissions. Thus, the processor 201 might be configured for obtaining information about a geographical position held by the first wireless communication terminal 101 and a geographical position held by the second wireless communication terminal 102 of the communication system 110. In some embodiments, the metric is related to an amount of data to be sent between the first wireless communication terminal 101 and the second wireless communication terminal 102. If much data is to be sent there between, the benefit of setting up D2D communication is great, whereby possibly a somewhat higher risk of interference may be tolerated. In some embodiments, the metric may be related to the topography of an area covered by the system 110. The topography may e.g. indicate whether there are any topographical obstacles (e.g. buildings, walls, hills etc.) which may make D2D communication between the first and second terminals more difficult, or which may shield the first and second terminals from other terminals such that the risk of interference with the other terminals is reduced. If e.g. the topographical information indicates that the first terminal is inside a building, the scheduling apparatus 109 may conclude that the risk of interference by transmissions from the first terminal 101 is reduced. It should be noted that the measuring 2 of a metric may be done before, after or at the same time as the obtaining 1 of an indication that D2D communication should be set up.

Based on the measurement 2, a first set of frequency and/or time resources for direct communication transmissions from the first terminal 101 to the second terminal 102 is allocated 3. The first set of f/t resources defines a first amount of signalling. The amount of signalling, i.e. the amount of radio signal, allowed from the first terminal to the second terminal is limited by the f/t resources allocated by the scheduling apparatus. Also based on the measurement 2, a second set of frequency and/or time resources for direct communication transmissions from the second terminal 102 to the first terminal 101 is allocated 4. The second set of f/t resources defines a second amount of signalling. According to the present disclosure, the first amount of signalling is larger than the second amount of signalling. Consequently, the second amount of signalling is less than the first amount of signalling. This implies that more signalling in D2D communication is allowed from the first terminal to the second terminal, than is allowed from the second terminal to the first terminal. The amount of signalling allowed from the second terminal from the first terminal may even be zero, i.e. no D2D transmission is allowed from the second terminal to the first terminal, e.g. if radio transmissions from the second terminal interferes, or is believed to interfere, substantially with other radio transmissions in the system 110.

Figure 6:
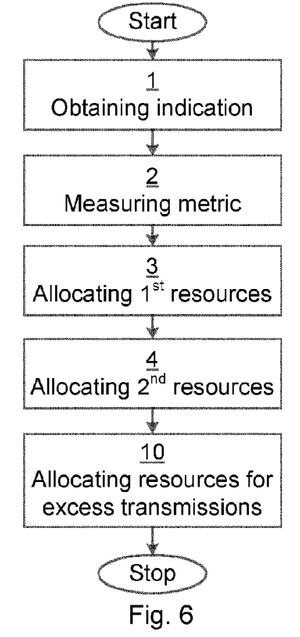
FIG. 6 is a schematic flow chart of another embodiment of a method of a scheduling apparatus, of the present disclosure.

FIG. 6 is a flow chart illustrating another embodiment of a method of a scheduling apparatus 109, of the present disclosure. The obtaining 1 of an indication, the measuring 2 of a metric, and the allocating 3 and 4 of first and second sets of f/t resources are as discussed above in relation to FIG. 5.

In the embodiment of FIG. 6, the method also comprises allocating 10 a third set of frequency and/or time resources for communication transmissions from the second terminal 102 to the first terminal 101 via a network node, e.g. an RBS 106 or 107 to which both the first and second terminals are connected or via a plurality of network nodes if the first and second terminals are connected to different RBSs. Since less f/t resources have been allocated to the direct D2D communication transmissions from the second terminal to the first terminal than allocated for D2D transmissions from the first terminal to the second terminal, the second terminal 102 may not be able to send all data that it wants to send to the first terminal D2D. Then, by means of the third set of f/t resources, the second terminal is allowed to send any excess data to the first terminal via the network in a regular fashion.

Figure 7:
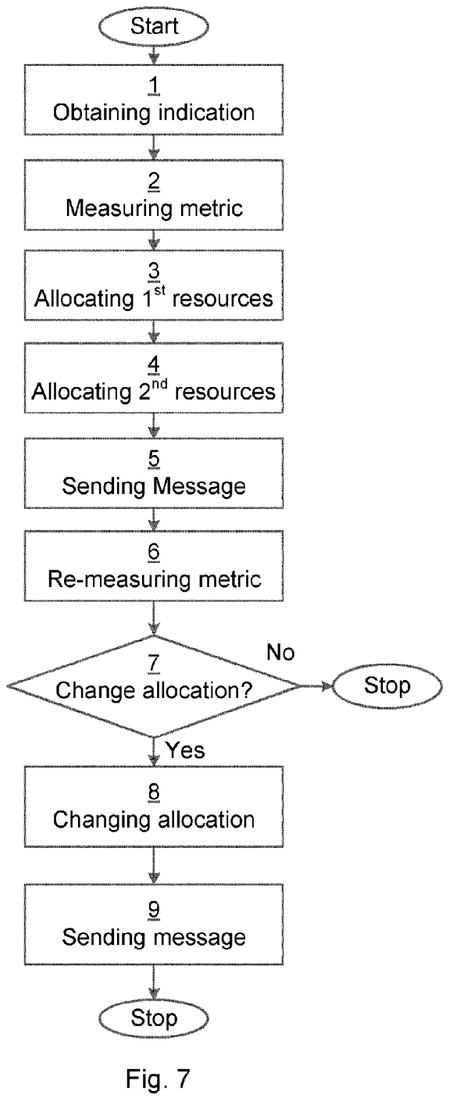
FIG. 7 is a schematic flow chart of another embodiment of a method of a scheduling apparatus, of the present disclosure.

FIG. 7 is a flow chart illustrating another embodiment of a method of a scheduling apparatus 109, of the present disclosure. The obtaining 1 of an indication, the measuring 2 of a metric, and the allocating 3 and 4 of first and second sets of f/t resources are as discussed above in relation to FIG. 5.

In some embodiments, a message comprising information about the allocated 3 and 4 frequency and/or time resources is sent 5 to at least one of the first terminal 101 and the second terminal 102. Information about the allocated f/t resources may be sent to one or both of the terminals 101 and 102, possibly together with instruction for setting up the direct communication. In this way the terminals are informed of the f/t resources they are allowed for D2D communication. If the message is only sent 5 to one of the first and second terminals, that terminal may then inform the other terminal in a D2D transmission.

In some embodiments, the method comprises re-measuring 6 the at least one metric. The metric may have changed over time, e.g. due to at least one of the first and second terminals having moved and/or due to another terminal in the communication system 110 having moved e.g. making it susceptible to interference from the D2D communication. Thus, based on the re-measurement 6, it may be determined 7 whether the first and or second sets of frequency and/or time resources allocated 3 and 4 to the first and/or second terminal(s) 101 and 102 should be changed. If it is determined that the allocations 3 and/or 4 should not be changed, the method may be stopped here, but if it is determined that at least one of the allocations 3 and 4 should be changed, the allocation is changed 8. The method may then comprise changing 8 the allocation of frequency and/or time resources for the direct communication between the first and second terminals 101 and 102, if it has been determined 7 that said resources should be changed. The changing 8 may comprise changing both the first and second sets of f/t resources, or only the first or the second set of f/t resources, depending on the result of the re-measurement 6. In order to inform the terminals 101 and 102 of the changed 8 allocation, a message may be sent 9 to at least one of the first terminal 101 and the second terminal 102. The message then comprises information about the changed 8 allocation of frequency and/or time resources, in analogy with the sending 5 of a message comprising information about the previous allocations 3 and 4 discussed above.

Figure 8:
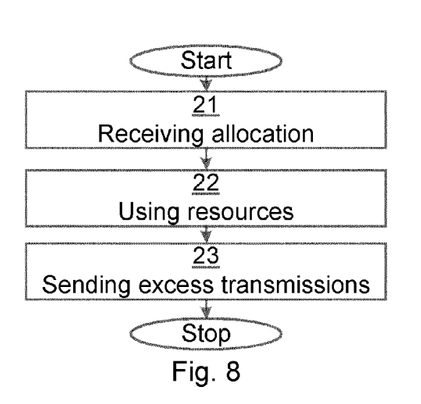
FIG. 8 is a schematic flow chart of an embodiment of a method of a wireless communication terminal, of the present disclosure.

FIG. 8 is a flow chart illustrating an embodiment of a method of a radio communication terminal 101 or 102. The terminal receives 21, over a radio interface, information about frequency and/or time resources allocated 3 and/or 4 for direct communication with another radio communication terminal 101 or 102. The allocation information may have been sent 5 or 9 by the scheduling apparatus 109, and by or via a RBS which the terminal is associated with/connected to, as discussed herein. The terminal then uses 22 the frequency and/or time resources for sending transmissions directly to the other radio communication terminal 101 or 102. Depending on whether the terminal is the first terminal 101 or the second terminal 102, the allocation information may comprise information about the first set of f/t resources allocated 3, and/or the second set of f/t resources allocated 4. If both the first and second sets of f/t resources are received, the terminal may send the allocation information to the other terminal to inform it of the allocations 3 and/or 4. If the set of f/t resources allocated 3 or 4 to the terminal for sending transmissions to the other terminal 101 or 102 does not define an amount of signalling which is enough for sending all the data to the other terminal which the terminal desires to send to the other terminal, the excess data may be sent to the other terminal via the network, i.e. via at least one network node such as a RBS 106 or 107. The terminal method may thus comprise sending 23 excess transmissions to the other radio communication terminal 101 or 102 via a network node 106 or 107, which excess transmissions can not be sent directly to the other radio communication terminal due to the frequency and/or time resources allocated for direct communication.

Figure 9:
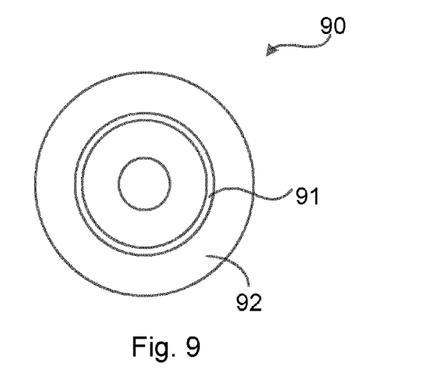
FIG. 9 is a schematic illustration of a computer program product of the present disclosure.

FIG. 9 illustrates a computer program product 80 of the present disclosure. The computer program product 80 comprises a computer readable medium 82 comprising a computer program 81 in the form of computer-executable components 81. The computer program/computer-executable components 81 may be configured to cause a scheduling apparatus 109, e.g. as discussed above, to perform an embodiment of a method discussed herein. The computer program/computer-executable components may be run on the processor 201 of the apparatus 109 for causing the apparatus to perform the method. The computer program product 80 may e.g. be comprised in a storage unit or memory comprised in the apparatus 109 and associated with the processor 201. Alternatively, the computer program product 80 may be, or be part of, a separate, e.g. mobile, storage means, such as a computer readable disc, e.g. CD or DVD or hard disc/drive, or a solid state storage medium, e.g. a RAM or Flash memory. Alternatively, the computer program/computer-executable components 81 may be configured to cause a radio communication terminal to perform an embodiment of a method discussed herein.

Example 1

Figure 10A:
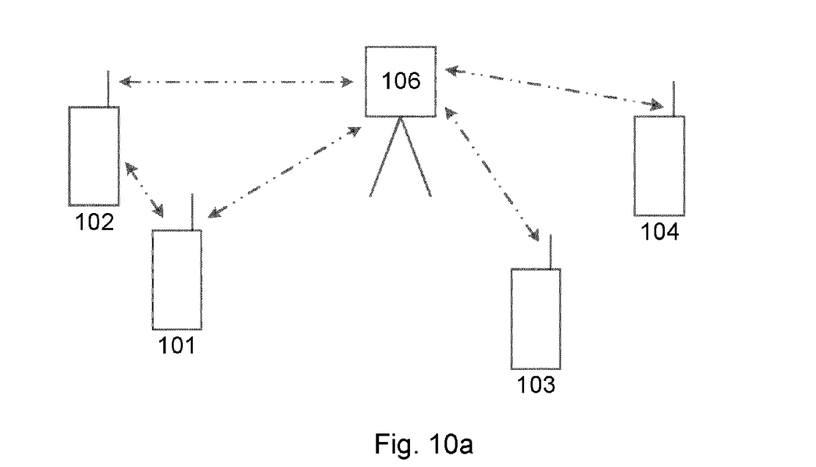
FIG. 10a is a schematic box diagram illustrating an example of a use of an embodiment of the present disclosure.
Figure 10B:
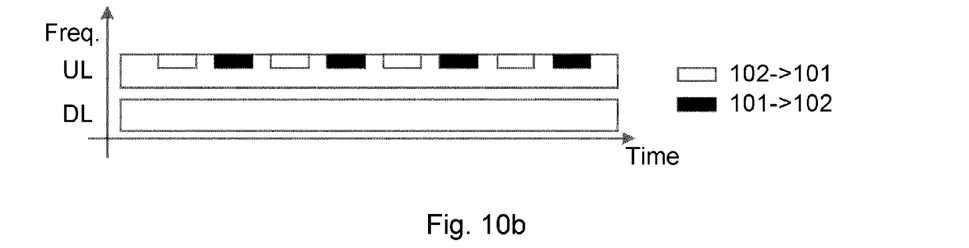

FIG. 10a shows an example of network (NW) assisted D2D communication. Several devices 101-104 are connected to a network node or RBS 106. The communication in this case is based on FDD, i.e. the UL and DL communication between the devices/terminals and the network node 106 is separated in frequency. Furthermore, the network node 106 (or another unit in the network comprising a scheduling apparatus 109) is in control of allocating time/frequency resources to terminals for UL/DL communication as well as resources for potential D2D communication (which could be resource blocks or similar in case the cellular system is operating according to the 3GPP LTE standard). In the example, certain resources in the UL frequency band have been allocated 3 and 4 for D2D communication between the first terminal 101 and the second terminal 102 (see FIG. 10b where allocated resources in the UL frequency band are indicated for D2D communication from the second terminal 102 to the first terminal 101 (non-filled bars) and from the first terminal 101 to the second terminal 102 (filled bars)). Furthermore, the network node 106 could also control the transmit power in the D2D communication, in order to not interfere with the ordinary UL traffic (for instance between the third and fourth terminals 103 and 104 and the network node 106).

Example 2

Figure 11A:
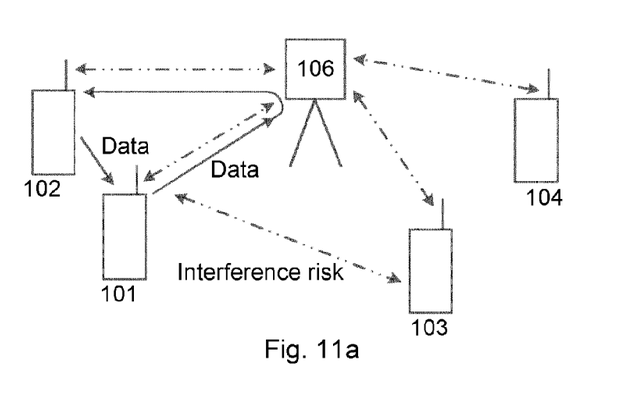
FIG. 11a is a schematic box diagram illustrating another example of a use of an embodiment of the present disclosure.
Figure 11B:
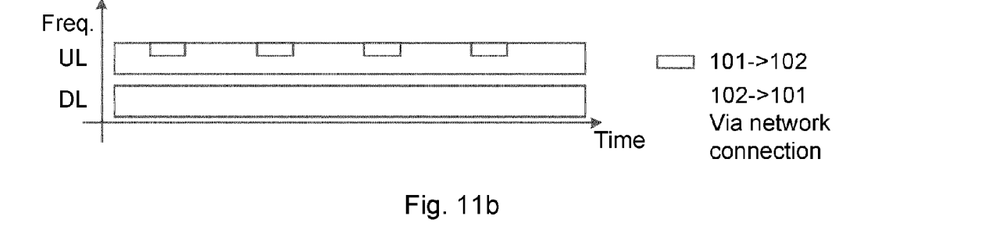

FIG. 11a shows a principal sketch over an exemplary embodiment. D2D communication between the first terminal 101 and the second terminal 102 is, due to various reasons (not limited by the present disclosure) desirable. The network (NW) node, e.g. RBS, 106 determines that there is a large risk for interference from the second terminal 102 to the third terminal 103 (e.g. due to the second and third terminals being too close to each other) and therefore will not allocate 4 any f/t resources for D2D communication from the second terminal 102. Instead, the NW node 106 initiates/configures a D2D connection from the first terminal 101 to the second terminal 102 by allocating 3 f/t resources for D2D transmissions from the first terminal 101 to the second terminal 102 on the UL frequency as shown in FIG. 11b (where allocated resources in the UL frequency band are indicated for D2D communication from the first terminal 101 to the second terminal 102 (non-filled bars) and there is no allocation for D2D communication from the second terminal 102 to the first terminal 101). Any data to be transmitted from the second terminal 102 to the first terminal 101 is instead relayed via the network node 106 (using standard cellular communication protocol, for instance LTE if that is the underlying NW communication protocol), thus avoiding interference with the UL transmissions from the third terminal 103 to the NW node 106.

Example 3

Figure 12A:
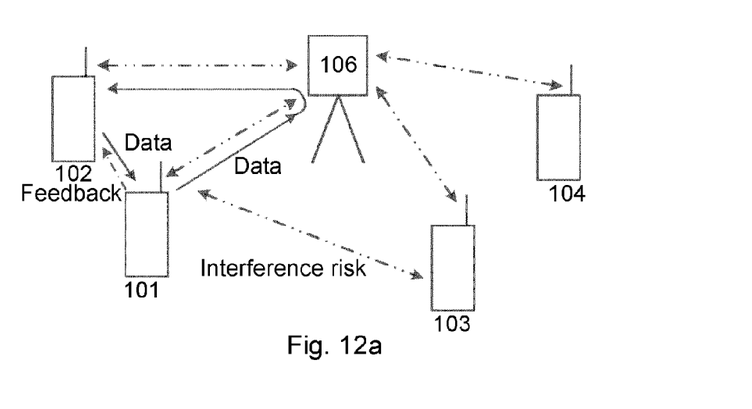
FIG. 12a is a schematic box diagram illustrating another example of a use of an embodiment of the present disclosure.
Figure 12B:
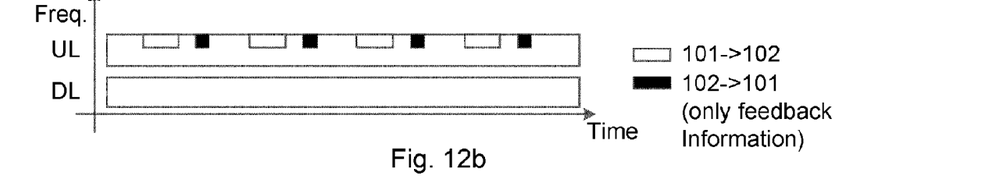

FIG. 12a shows a principal sketch over another exemplary embodiment. D2D communication between the first terminal 101 and the second terminal 102 is, due to various reasons (not limited by the present disclosure) desirable. The network (NW) node, e.g. RBS, 106 determines that there is a large risk for interference from the second terminal 102 to the third terminal 103 (e.g. due to the second and third terminals being too close to each other) and therefore will only allocate a 4 small f/t resource for transmissions from the second terminal 102 to the first terminal 101 of D2D communication (see FIG. 12b where allocated resources in the UL frequency band are indicated for D2D communication from the first terminal 101 to the second terminal 102 (non-filled bars) and from the second terminal 102 to the first terminal 101 (smaller filled bars)). For instance, the resource allocation 4 may be such that only HARQ ACK/NAKs (on received data packets from the first terminal 101) are allowed to be transmitted on these resources from the second terminal 102 to the first terminal 101. Another example is that only CQI and/or CSI reports and/or potential rank information, additionally or alternatively to HARQ ACK/NAKs, are allowed to be transmitted on these resources from the second terminal 102 to the first terminal 101. Another example is that only feedback information such as HARQ ACK/NAKs and/or CQI and/or CSI reports are allowed to be transmitted on these resources from the second terminal 102 to the first terminal 101. The NW node 106 then initiates/configures a D2D connection from the first terminal 101 to the second terminal 102 by allocating 3 f/t resources for D2D transmissions from the first terminal 101 to the second terminal 102 on the UL frequency as shown in FIG. 11b, while only f/t resources for feedback information is allocated 4 for transmissions from the second terminal 102 to the first terminal 101. Furthermore, excess data, i.e. data which is not feedback information, to be transmitted from the second terminal 102 to the first terminal 101 is instead relayed via the network node 106 (using standard cellular communication protocol, for instance LTE if that is the underlying NW communication protocol), thus avoiding interference with the UL transmissions from the third terminal 103 to the NW node 106.

Example 4

According to an embodiment of the present disclosure, there is provided a scheduling apparatus 109 for a cellular radio communication system 110. The apparatus comprises means for obtaining 1 an indication that direct wireless communication should be set up between a first wireless communication terminal 101 and a second wireless communication terminal 102 of the communication system 110. The apparatus also comprises means 201 for measuring 2 at least one metric of the communication system 110. The apparatus also comprises means 201 for allocating 3, based on said measurement 2, a first set of frequency and/or time resources for direct communication transmissions from the first terminal 101 to the second terminal 102, the first set defining a first amount of signalling. The apparatus also comprises means 201 for allocating 4, based on said measurement 2, a second set of frequency and/or time resources for direct communication transmissions from the second terminal 102 to the first terminal 101, the second set defining a second amount of signalling. The second amount of signalling is less than the first amount of signalling.

Example 5

According to an embodiment of the present disclosure, there is provided a radio communication terminal 101 or 102. The terminal comprises means 401 and 404 for receiving, over a radio interface, information about frequency and/or time resources allocated 3 and/or 4 for direct communication with another radio communication terminal 102 or 101. The terminal also comprises means 401 and 403 for using the frequency and/or time resources for sending transmissions directly to the other radio communication terminal. The terminal also comprises means 401 and 403 for sending excess transmissions to the other radio communication terminal 102 or 101 via a network node 106, which excess transmissions can not be sent directly to the other radio communication terminal due to the frequency and/or time resources allocated for direct communication.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:
1. A scheduling apparatus for reducing interference in a cellular radio communication system, the scheduling appa- ratus comprising a processor and a memory, the memory containing instructions executable by the processor whereby the scheduling apparatus is configured to:

obtain an indication that direct wireless communication should be set up between a first wireless communication terminal and a second wireless communication terminal of the communication system;

measure at least one metric of the communication system, the measurement indicating a risk that signaling from the second terminal to the first terminal will cause interference to another wireless communication terminal or a network node;

allocate, based on the measurement, a first set of resources for direct communication transmissions from the first terminal to the second terminal, the resources of the first set of resources being frequency and/or time resources, the first set defining a first amount of signaling;

allocate, based on the measurement, a second set of resources for direct communication transmissions from the second terminal to the first terminal, the resources of the second set of resources being frequency and/or time resources, the second set defining a second amount of signaling, wherein the second amount of signaling is less than the first amount of signaling based on the measurement indicating a risk of interference; and allocate, based on the second amount of signaling being less than the first amount of signaling, frequency and/or time resources for sending other transmissions from the second terminal to the first terminal via a network node, wherein the other transmissions cannot be sent directly between the first and second terminals due to the frequency and/or time resources allocated for direct communication.

2. The scheduling apparatus of claim 1, wherein the second amount of signaling is zero.

3. The scheduling apparatus of claim 1, wherein the second set of resources limits direct communication transmissions, from the second terminal to the first terminal, to feedback information in response to direct communication transmissions received from the first terminal.

4. The scheduling apparatus of claim 1, wherein the memory contains instructions executable by the processor whereby the scheduling apparatus is configured to allocate the frequency and/or time resources for sending other transmissions between the first and second terminals via a network node, wherein the other transmissions are sent from the second terminal to the first terminal simultaneously with transmissions from the second terminal to the first terminal defined by the second amount of signaling.

5. The scheduling apparatus of claim 3, wherein the memory contains instructions executable by the processor whereby the scheduling apparatus is configured to control the second amount of signaling to be less than the first amount of signaling by the allocating of the frequency and/or time resources for sending the other transmissions.

6. The scheduling apparatus of claim 1, wherein the memory contains instructions executable by the processor whereby the scheduling apparatus is configured to measure at least one metric of the communication system by measuring a metric related to a risk that signaling from the second terminal to the first terminal will cause interference in communication between a third wireless communication terminal and a network node of the communication system.

7. The scheduling apparatus of claim 1, wherein the memory contains instructions executable by the processor whereby the scheduling apparatus is configured to measure at least one metric of the communication system by measuring a metric related to a risk that signaling from the second terminal to the first terminal will cause interference in direct communication between a third wireless communication terminal and a fourth wireless communication terminal of the communication system.

8. The scheduling apparatus of claim 1, wherein the memory contains instructions executable by the processor whereby the scheduling apparatus is configured to measure at least one metric of the communication system by measuring a metric related to a position of at least one of the first wireless communication terminal and the second wireless communication terminal.

9. The scheduling apparatus of claim 1, wherein the memory contains instructions executable by the processor whereby the scheduling apparatus is configured to measure at least one metric of the communication system by measuring a metric related to an amount of data to be sent between the first wireless communication terminal and the second wireless communication terminal.

10. The scheduling apparatus of claim 1, wherein:

the scheduling apparatus comprises a transmitter configured for wirelessly sending a message comprising information about the allocated frequency and/or time resources to at least one of the first terminal and the second terminal;

the memory contains instructions executable by the processor whereby the scheduling apparatus is configured to prepare and supply the message for the transmitter.

11. The scheduling apparatus of claim 10, wherein the memory contains instructions executable by the processor whereby the scheduling apparatus is configured to:

re-measure the at least one metric;

determine, based on the re-measurement, whether the frequency and/or time resources allocated to the first terminal and/or the second terminal should be changed;

in response to determining that the resources should be changed:

change the allocation of frequency and/or time resources for the direct communication between the first and second terminals;

prepare and supply a message, comprising information about the changed allocation of frequency and/or time resources, for the transmitter, for wireless transmission to at least one of the first terminal and the second terminal.

12. The scheduling apparatus of claim 1, wherein the metric is related to an amount of data to be sent from the first terminal to the second terminal, and wherein the first amount of signaling is the amount of data to be sent between the first terminal to the second terminal.

13. The scheduling apparatus of claim 1, wherein the risk is a risk of interference that would be caused by an allocation of resources that define an amount of signaling greater than zero from the second terminal to the first terminal, and wherein the second set of resources define an amount of signaling that is greater than zero.

14. The scheduling apparatus of claim 1, wherein the memory contains instructions executable by the processor whereby the scheduling apparatus is configured to:

allocate the first set of resources for feedback transmissions for data received from the second terminal, and data transmissions to the second terminal; and allocate the second set of resources for feedback transmissions for the data transmissions to the second terminal.

15. The scheduling apparatus of claim 1, wherein the memory contains instructions executable by the processor whereby the scheduling apparatus is configured to allocate the frequency and/or time resources for sending other transmissions to reduce the interference indicated by the measurement.

16. The scheduling apparatus of claim 1, wherein the first and second resources each comprises a plurality of frequency resources.

17. A network node of a cellular radio communication system, comprising a scheduling apparatus for reducing interference in the communication system, the scheduling apparatus comprising a processor and a memory containing instructions executable by the processor whereby the scheduling apparatus is configured to:
  obtain an indication that direct wireless communication should be set up between a first wireless communication terminal and a second wireless communication terminal of the communication system;
  measure at least one metric of the communication system, the measurement indicating a risk that signaling from the second terminal to the first terminal will cause interference to another wireless communication terminal or a network node;
  allocate, based on the measurement, a first set of resources for direct communication transmissions from the first terminal to the second terminal, the resources of the first set of resources being frequency and/or time resources, the first set defining a first amount of signaling;
  allocate, based on the measurement, a second set of resources for direct communication transmissions from the second terminal to the first terminal, the resources of the second set of resources being frequency and/or time resources, the second set defining a second amount of signaling, wherein the second amount of signaling is less than the first amount of signaling based on the measurement indicating a risk of interference; and
  allocate, based on the second amount of signaling being less than the first amount of signaling, frequency and/or time resources for sending other transmissions from the second terminal to the first terminal via a network node, wherein the other transmissions cannot be sent directly between the first and second terminals due to the frequency and/or time resources allocated for direct communication.

18. The network node of claim 17, wherein the network node is a first radio base station (RBS) to which both the first and second terminals are connected.

19. A method in a scheduling apparatus for reducing interference in a cellular radio communication system, the method comprising:
  obtaining an indication that direct wireless communication should be set up between a first wireless communication terminal and a second wireless communication terminal of the communication system;
  measuring at least one metric of the communication system, the measurement indicating a risk that signaling from the second terminal to the first terminal will cause interference to another wireless communication terminal or a network node;
  allocating, based on the measurement, a first set of resources for direct communication transmissions from the first terminal to the second terminal, the resources of the first set of resources being frequency and/or time resources, the first set defining a first amount of signaling;
  allocating, based on the measurement, a second set of resources for direct communication transmissions from the second terminal to the first terminal, the resources of the second set of resources being frequency and/or time resources, the second set defining a second amount of signaling, wherein the second amount of signaling is less than the first amount of signaling based on the measurement indicating a risk of interference; and
  allocating, based on the second amount of signaling being less than the first amount of signaling, frequency and/or time resources for sending other transmissions from the second terminal to the first terminal via a network node, wherein the other transmissions cannot be sent directly between the first and second terminals due to the frequency and/or time resources allocated for direct communication.

20. The method of claim 19, further comprising sending a message comprising information about the allocated frequency and/or time resources to at least one of the first terminal and the second terminal.

21. The method of claim 19, further comprising:
  re-measuring the at least one metric;
  determining, based on the re-measurement, whether the frequency and/or time resources allocated to the first terminal and/or the second terminal should be changed;
  in response to determining that the resources should be changed:
    changing the allocation of frequency and/or time resources for the direct communication between the first and second terminals;
    sending a message, comprising information about the changed allocation of frequency and/or time resources, to at least one of the first terminal and the second terminal.

22. A computer program product stored in a non-transitory computer readable medium for controlling a scheduling apparatus to aid in reducing interference in a cellular radio communication system, the computer program product comprising software instructions which, when run on one or more processing circuits of the scheduling apparatus, causes the scheduling apparatus to:
  obtain an indication that direct wireless communication should be set up between a first wireless communication terminal and a second wireless communication terminal of the communication system;
  measure at least one metric of the communication system, the measurement indicating a risk that signaling from the second terminal to the first terminal will cause interference to another wireless communication terminal or a network node;
  allocate, based on the measurement, a first set of resources for direct communication transmissions from the first terminal to the second terminal, the resources of the first set of resources being frequency and/or time resources, the first set defining a first amount of signaling;
  allocate, based on the measurement, a second set of resources for direct communication transmissions from the second terminal to the first terminal, the resources of the second set of resources being frequency and/or time resources, the second set defining a second amount of signaling, wherein the second amount of signaling is less than the first amount of signaling based on the measurement indicating a risk of interference; and allocate, based on the second amount of signaling being less than the first amount of signaling, frequency and/or time resources for sending other transmissions from the second terminal to the first terminal via a network node, wherein the other transmissions cannot be sent directly between the first and second terminals due to the frequency and/or time resources allocated for direct communication.

23. A second radio communication terminal comprising:
a transmitter,
a receiver configured to receive a first amount of signaling from a first radio communication terminal;
a processor; and
memory, the memory containing instructions executable by the processor whereby the second radio communication terminal is configured to:
   obtain information about frequency and/or time resources allocated for direct communication transmissions from the second radio communication terminal to the first radio communication terminal;
   use the frequency and/or time resources for preparing transmissions to be sent by the transmitter directly to the first radio communication terminal, wherein the prepared transmissions define a second amount of signaling less than the first amount of signaling, and wherein the second amount of signaling is less than the first amount of signaling based on a measurement indicating a risk that signaling from the second radio communication terminal to the first radio communication terminal will cause interference to another wireless communication terminal or a network node;
   prepare, based on the second amount of signaling being less than the first amount of signaling, other transmissions to be sent by the transmitter to the first radio communication terminal via a network node, wherein the other transmissions cannot be sent directly to the first radio communication terminal due to the frequency and/or time resources allocated for direct communication.

24. The radio communication terminal of claim 23, wherein the memory contains instructions executable by the processor whereby the radio communication terminal is configured to determine, based on the obtained information, that the frequency and/or time resources allocated for direct communication are not enough resources for sending all the data from the radio communication terminal to the other radio communication terminal, and wherein the radio communication terminal is configured to prepare the other transmissions based on the determination.

25. The radio communication terminal of claim 23, wherein the memory contains instructions executable by the processor whereby the radio communication terminal is configured to receive information indicating frequency and/or time resources allocated for the other transmissions between the radio communication terminal via a network node, and to prepare the other transmissions to be sent on the frequency and/or time resources allocated for the other transmissions.

26. A method of operating a second radio communication terminal, the method comprising:
   receiving a first amount of signaling from a first radio communication terminal;
   receiving information about frequency and/or time resources allocated for direct communication transmissions from the second radio communication terminal to the first radio communication terminal;
   using the frequency and/or time resources for sending transmissions directly to the first radio communication terminal, wherein the transmissions define a second amount of signaling less than the first amount of signaling, and wherein the second amount of signaling is less than the first amount of signaling based on a measurement indicating a risk that signaling from the second radio communication terminal to the first radio communication terminal will cause interference to another wireless communication terminal or a network node; and
   sending, based on the second amount of signaling being less than the first amount of signaling, other transmissions to the first radio communication terminal via a network node, wherein the other transmissions cannot be sent directly to the first radio communication terminal due to the frequency and/or time resources allocated for direct communication.

* * * * *